United States Patent [19]

Berg

[11] 4,225,376
[45] Sep. 30, 1980

[54] METHOD FOR PRODUCING A LAMINATED SURFACE

[75] Inventor: Rolf Berg, Djursholm, Sweden

[73] Assignee: Assi Can Aktiebolag, Stockholm, Sweden

[21] Appl. No.: 909,428

[22] Filed: May 25, 1978

[30] Foreign Application Priority Data

Oct. 4, 1977 [SE] Sweden .............................. 7711063

[51] Int. Cl.² .......................... B29C 27/02; C09J 5/06
[52] U.S. Cl. .................................... 156/272; 156/306; 156/320; 156/322; 156/324; 156/309.9; 156/324.4
[58] Field of Search .............. 156/272, 306, 320, 322, 156/497, 82, 324, 499

[56] References Cited

U.S. PATENT DOCUMENTS

| 3,322,593 | 5/1967 | Conti | 156/324 |
| 3,364,091 | 1/1968 | Conti | 156/324 |
| 3,575,762 | 4/1971 | Goehring et al. | 156/322 X |
| 3,660,200 | 5/1972 | Anderson et al. | 156/306 |
| 3,783,062 | 1/1974 | Martin | 156/82 |

Primary Examiner—Michael G. Wityshyn
Attorney, Agent, or Firm—Sughrue, Rothwell, Mion, Zinn and Macpeak

[57] ABSTRACT

In the bonding of two webs, each having a polyolefin resin surface thereon, to form a laminate the polyolefin surface of a first of said webs is heated to a temperature at which the resin will melt or become tacky, while the polyolefin surface of the second of said webs is heated to a given temperature. The heated surfaces are then brought together in a manner to form a substantially permanent bond therebetween. One advantage of the method is that extremely thick high-density plastic foils can be bonded successfully to fibrous carriers.

18 Claims, 1 Drawing Figure

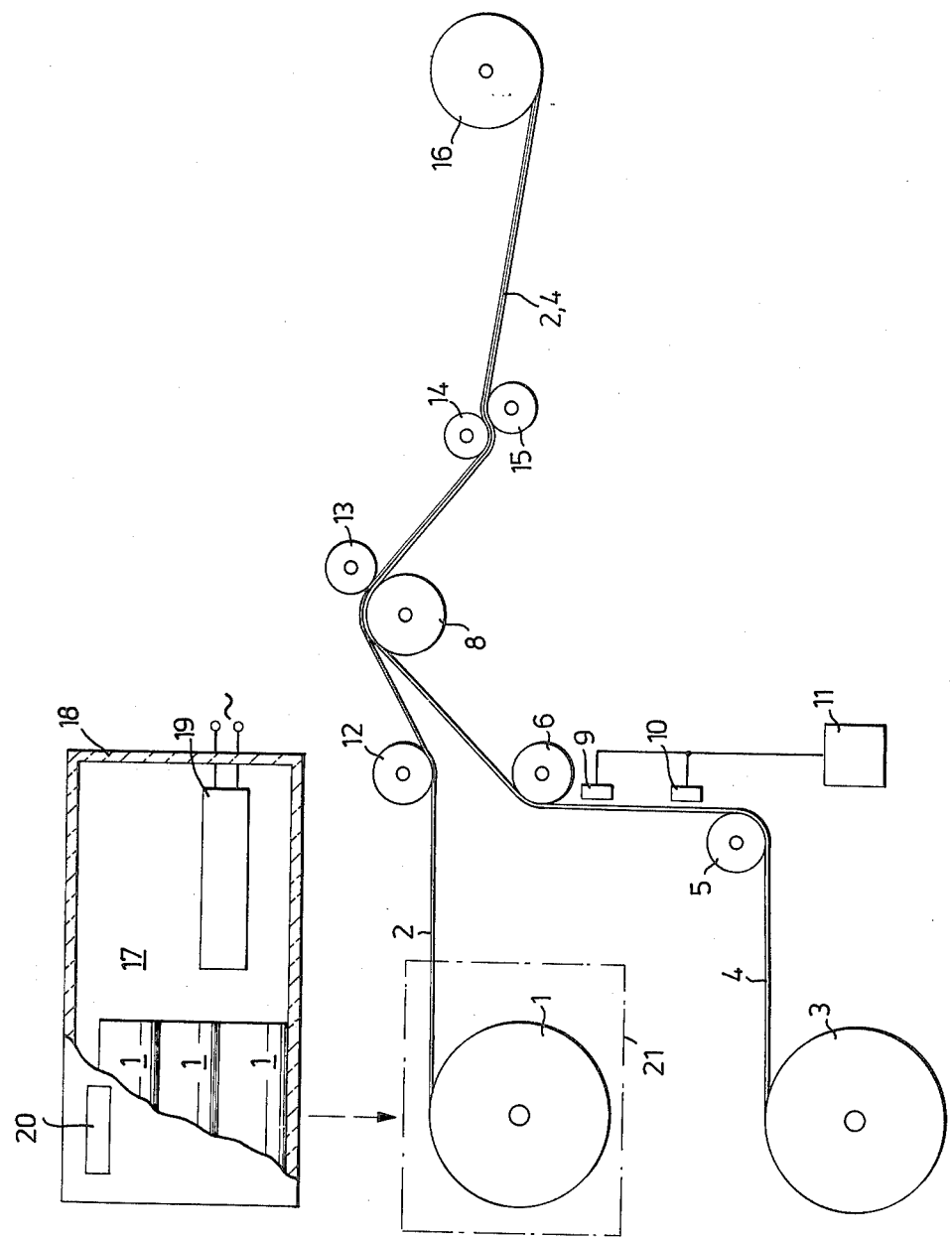

METHOD FOR PRODUCING A LAMINATED SURFACE

The present invention relates to a method of producing a laminated structure from two webs each of which has thereon a surface comprising a polyolefin resin.

It is known that a thin web of polyolefin resin, such as high-density polyethylene can be successfully bonded to a thicker web of, say, a fibrous material, such as kraft paper, having a surface of polyolefin resin thereon, to form a laminate, by bringing said surface to a tacky or molten state and bonding the webs together. Normally, the web of fibrous material is sprayed with a heat-meltable plastics material to a thickness of, for example, 0.02 mm. This is generally satisfactory when the temperature of the foil web corresponds to room temperature, provided that the thickness of the foil web does not exceed, say, 0.02 mm. If the thickness of the foil web is greater than this value, the bond at certain areas of the laminate will be poor, while, if the thickness exceeds approximately 0.07 mm, the bond will be non-existent. The problem of bonding is particularly serious when polyolefin plastics of the HD-type are used in respect of the foil and possibly also in respect of the coating on the fibre web. High density polyethylene, which is produced at relatively low pressures whilst using a catalyst, comprises a chain of molecules with but few side branches. High density polyethylene is relatively rigid and extremely resistent to, for example, oils and solvents and laminates comprising HD-polyethylene foil are consequently used over an extremely wide field. Hitherto, it has not been possible to utilise the good properties of this plastics when a relatively thick foil must be used, owing to the difficulty of bonding a foil web made of such a plastics material with a fibre web, or with another relatively thick foil for example, when the bond between the two webs shall be effected rapidly, for example at a speed of 0.5 m/s. The pressure required to join the two webs is normally produced through pressure rollers and consequently, unless rollers of extremely large diameters are used, the length of time which the two webs must be in contact with the rollers, and thus also the pressing time, will be very short. The reason why a HD-polyethylene web having a thickness exceeding about 0.02 mm and a temperature corresponding to room temperature is unable to fasten to a molten layer of polyethylene or to a layer of any other polyolefin, is thought to be due to an inherent "sluggishness" of the molecules; this sluggishness being manifested by the inability of the layer to melt until a certain time has lapsed after applying heat to the layer and by the fact that this reaction time increases with the thickness of the plastics foil. When a polyethylene foil of small thickness, for example 0.01 mm, is pressed against a molten layer on, for example, a fibre web having a temperature of, for example, 130° C., heat is transferred from the coating to the plastics foil, and owing to the small thickness of the foil causes laminar melting. The two webs are bonded positively together during the time pressure is exerted. If, however, a thick polyethylene foil whose temperature corresponds to room temperature is applied to the molten coating, the reaction time of the molecules of the foil is so long and the amount of heat taken up so great that no melting takes place during the time pressure is applied thereby rendering it impossible to obtain a bond.

This problem relating to the sluggishness of, for example, polyethylene molecules, when two coated fibre webs shall be bonded together, has been overcome by melting the coatings of the two fibre webs and then pressing them against each other. This technique, however, cannot be applied when a plastics foil web shall be bonded, for example, to a coated fibre web, since heating of the plastics web, with for example a gas flame, immediately upstream of the bonding zone with the fibre web, causes the plastics foil to be burned or softened to such an extent that it cannot be drawn from the storage reel without stretching. Even though heating with a gas flame, or some other suitable source of heat, immediately upstream of the bonding zone is theoretically conceivable, the long reaction time of a thick HD-polyethylene will render it impossible to bond the two webs together, unless the webs are advanced very slowly, which causes the process to be of no interest from an industrial point of view.

It is, therefore, an object of the present invention to provide a novel and useful method of laminating a relatively thick foil web having a polyolefin surface thereon, such as a high density polyethylene or polypropylene with a further web having a polyolefin surface thereon. More specifically, the novel method is based on a technique in which the molecules are "awakened" or activated long prior to bonding the webs together, in a manner such that they will immediately react to the heat applied to melt the plastics, irrespective of the thickness of the plastics foil.

According to one aspect this invention consists in a method of bonding a first web taken from a first storage reel to a second web taken from a second storage reel, each of said webs having a polyolefin resin surface thereon, comprising the steps of heating the surfaces of the first web to a tacky or molten state, heating the surfaces of the second web to a given temperature, and pressing said surfaces together to form a laminate, said given temperature being of a magnitude such that said surfaces, when pressed together will be joined to form a substantially permanent bond therebetween.

According to another aspect this invention consists in an apparatus for carrying out the method for forming a first web having a polyolefin surface thereon to a second web having a polyolefin surface thereon in a manner such as to form a bonded laminate, comprising first-web storage means; second-web storage means; first removal means for removing said first web from said first-web storage means and passing it to a bonding station; second removal means for removing said second web from said second-web storage means and passing it to said bonding station; first heating means for heating said polyolefin surface of said first web to a tacky or molten state; second heating means arranged upstream of said bonding station for heating said polyolefin surface of said second web to a given temperature; and means arranged at said bonding station for bringing said heated surfaces into bonded contact with one another, said given temperature being of a magnitude such that when formed together a substantially permanent bond will be formed between said surfaces.

So that the invention will be more readily understood and further features thereof made apparent, the invention will be described with reference to the accompanying schematic drawing, the single FIGURE of which illustrating an embodiment of an apparatus for carrying out the method.

In the figure there is illustrated a heating cabinet or room 17, all the walls of which are insulated by means of an insulating material 18. The cabinet or room 17 has a door (not shown), through which storage reels 1 can be placed in and removed from said room. Arranged in the cabinet 17 is a heating element 19, which may be an electric heating element, for heating the interior of the cabinet to the temperature desired. The temperature can be adjusted by means of a thermostat 20 arranged outside the cabinet. Prior to using the plastics foil, the storage reel 1 is placed in the heating cabinet and the temperature of the cabinet interior is adjusted by means of the thermostat 20 in a manner such that the interior of said cabinet has a temperature beneath the melting temperature of the plastics material and is preferably adjusted to a temperature corresponding to 50-95% of the melting temperature of said material, the melting temperature of a high density polyethylene plastic material being within the range of 110°-150° C. The storage reels 1 are left in the cabinet until the whole of the foil material has substantially obtained the temperature of the cabinet 17, for example 114° C. for a thick (0.2 mm) HD-foil. Immediately prior to the time when the foil web shall be bonded to the further web, which may be a fibre web, a warmed storage reel 1 is removed from the cabinet and mounted onto the laminating machine. The heating storage reel 1 contains a plastics web 2, which is, for example, a web of high density polyethylene. The web to be bonded to the web 2 to form said laminate is wound on a storage reels 3, said web in the illustrated embodiment being a paper web 4, for example, a kraft liner. The surface of the paper web 4 remote from the centre of the storage reel 3 has applied thereon a plastics layer, for example a layer of high-density polyethylene.

The paper web 4 extends from the storage reel 3 over an idler roller 5 and from there to an idler roller 6. The paper web 4 extends from the idler roller 6 to a further idler roller 8. In the illustrated embodiment, there is arranged between the two idler rollers 5 and 6 two heating elements 9 and 10 to which energy is supplied from a source of energy 11. The heating element 9 and 10 may comprise electric resistance elements arranged to be heated to a red-hot glow, or may comprise gas burners. Heat is supplied uniformly to the surface of the paper web 4 facing the elements 9 and 10 and the plastics layer located on the other side of the paper web is thereby brought to a tacky state. Although it is possible to apply the heat directly to the plastics coating, it is preferred to heat the coating through the paper web, since in this way a greater quantity of heat is accumulated.

The warm web 2 of plastics foil passes under an idler roller 12 and form there over the paper web 4 on the idler roller 8. Since the surface of the paper web 4 facing the plastics web is very hot, for example has a temperature of 150° C., and the coating is molten, good heat-transfer contact is obtained between the two webs and heat is transferred to the foil web 2 from the mass comprising the paper web 4 and its coating. Although not shown, the coating on the paper web 4 is continuous and covers the whole of the surface of the web.

The foil web 2, which when wound on the storage reel 1 has a temperature of, for example, 50°-120° C., depending on the thickness of the foil web and which has substantially the same temperature when it reaches the pressing station 8, 13, is in such a state that the molecules in the material react immediately to the heat transferred from the paper web 4 and its coating. A laminar layer on the side turned towards the paper web, therefore, begins to melt immediately and is welded together with the coatings on the paper web 4.

Practical tests have shown that perfect bonding of the two webs is obtained, even when the foil web comprising a high density polyethylene has a thickness of 0.125 mm and an advancing speed of 1 m/s. In order to obtain perfect bonding under such conditions, the starting temperature of the plastics foil is approximately 100° C. when being joined to the web 4.

Subsequent to welding to the two webs together, they are passed to a winding device 16 or directly to a processing machine.

If, for some reason, the laminate is to be made intermittently, it may be convenient to arrange a heating box or the like around the reel 1 of foil arranged in the laminating machine, thereby to prevent the temperature from falling to undesired levels. Such a box may be provided with a heating element of the same type as the heating element 19. Such a heating box is illustrated in the figure at 21. Should the preheating of the reel 1 not be sufficient it is also possible to add the necessary additional heat energy to the foil by, for example, heating the roller 12 to a temperature such that the foil 2 leaving the roller 12 obtains the necessary temperature to give perfect bonding to the web 4.

It should further be noted that the plastics foil 2 can in itself be a laminate. For example, the foil may be a sheet of aluminium foil, on which a plastics layer of the above type has been applied. The aluminium foil is in this case, of course, situated on the side of the plastics layer remote from the web 4. The necessary heat for bringing the plastics foil to an adequate temperature can be supplied by an electric field creating eddy currents in the aluminium foil, so as to heat the latter and, thus, also the plastics foil.

What I claim is:

1. A method of bonding a first web, taken from a first storage reel, to a second web taken from a second storage reel, each of said webs having a polyolefin resin surface thereon comprising the steps of heating the polyolefin resin surface of the first web to a tacky or molten state, heating the polyolefin resin surface of the second web to a given temperature beneath the melting temperature thereof prior to unreeling the second web, substantially maintaining said temperature of the second web throughout the remaining steps, and pressing said polyolefin resin surfaces together while the polyolefin resin surface on the first web remains in the tacky or molten state to form a laminate, the temperature of the second web at lamination being of a magnitude such that said polyolefin resin surfaces, when pressed together, will be joined to form a substantially permanent bond therebetween.

2. A method according to claim 1, wherein the first web comprises a fibrous material having a surface of polyolefin resin thereon, and wherein the second web consists of a foil of polyolefin resin and wherein the means of heating the second web is not by flame.

3. A method according to claim 1, wherein the first web comprises an aluminum material having a polyolefin resin surface thereon, and wherein the second web comprises a foil of polyolefin resin.

4. A method according to claim 1, wherein said first and said second webs consist of polyolefin foils.

5. A method according to any one of the preceding claims, in which the second web comprises a high density polyethylene plastic material having a melting temperature within the range of 110° to 150° C., wherein said surface of said second web is brought to a temperature corresponding to 50 to 95% of the melting temperature of said resin.

6. A method according to claim 5 wherein the first web comprises an aluminum material having a polyolefin resin surface thereon, wherein the second web comprises a foil of polyolefin resin and wherein the polyolefin coating of the first web is heated by creating electrical eddy currents in said aluminum foil.

7. A method according to claim 4 wherein the first web comprises an aluminum material having a polyolefin surface thereon, and wherein the second web comprises a foil of polyolefin resin, wherein the polyolefin coating of the first web is heated by creating electrical eddy currents in said aluminum foil.

8. A method according to any one of claims 1 to 4, wherein said surface of said second web is heated to said given temperature, whilst wound on said second storage reel.

9. A method according to claim 8 wherein the first web comprises an aluminum material having polyolefin resin surface thereon, and wherein the second web comprises a foil of polyolefin resin and wherein the polyolefin coating of the first web is heated by creating electrical eddy currents in said aluminum foil.

10. A method according to any one of claims 1 to 4, wherein said surface of said second web is heated to said given temperature during its travel from the second storage reel to said first web.

11. A method according to claim 10 wherein the first web comprises an aluminum material having a polyolefin resin surface thereon, wherein the second web comprises a foil of polyolefin resin and wherein the polyolefin coating of the first web is heated by creating electrical eddy currents in said aluminum foil.

12. A method according to any one of claims 1 to 4, wherein said surface of said second web is preheated on said second storage reel and is then further heated to said given temperature during its travel from the second storage reel to said first web.

13. A method according to claim 12 wherein the first web comprises an aluminum material having a polyolefin resin surface thereon, wherein the second web comprises a foil of polyolefin resin and wherein the polyolefin coating of the first web is heated by creating electrical eddy currents in said aluminum foil.

14. A method according to any one of claims 1-4 in which the second web comprises a high density polyethylene plastic material having a melting temperature within the range of 110° to 150° C., wherein said surface of said second web is brought to a temperature corresponding to 50 to 95% of the melting temperature of said resin and wherein said surface of said second web is heated to said given temperature, whilst wound on said second storage reel.

15. A method according to any one of claims 1-4 in which the second web comprises a high density polyethylene plastic material having a melting temperature within the range of 110° to 150° C., wherein said surface of said second web is brought to a temperature corresponding to 50 to 95% of the melting temperature of said resin and wherein said surface of said second web is heated to said given temperature during its travel from the second storage reel to said first web.

16. A method according to any one of claims 1-4 in which the second web comprises a high density polyethylene plastic material having a melting temperature within the range of 110° to 150° C., wherein said surface of said second web is brought to a temperature corresponding to 50 to 95% of the melting temperature of said resin and wherein said surface of said second web is preheated on said second storage reel and is then further heated to said given temperature during its travel from the second storage reel to said first web.

17. A method according to claim 1 in which the second web comprises a high density polyethylene plastic material having a melting temperature within the range of 110°–150° C., wherein the second storage reel of second web of material is brought to a temperature corresponding to 50–95% of the melting temperature.

18. A method according to claim 17, wherein the second web is brought to a temperature of 70° C.

* * * * *